US012321378B2

(12) United States Patent
Miranda Bautista et al.

(10) Patent No.: US 12,321,378 B2
(45) Date of Patent: Jun. 3, 2025

(54) EPHEMERAL CLOUD FOR MULTI-PERSPECTIVE MULTIMEDIA GENERATION

(71) Applicant: INTERNATIONAL BUSINESS MACHINES CORPORATION, Armonk, NY (US)

(72) Inventors: Mara Miranda Bautista, Tlajomulco de Zuniga (MX); Paul Llamas Virgen, Guadalajara (MX); Silvia Esther Sanchez Lopez, Tlaquepaque (MX); Carlos Andres Martinez Vazquez, Tlaquepaque (MX)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 18/462,694

(22) Filed: Sep. 7, 2023

(65) Prior Publication Data
US 2025/0086223 A1 Mar. 13, 2025

(51) Int. Cl.
*G06F 16/487* (2019.01)
*H04L 9/40* (2022.01)

(52) U.S. Cl.
CPC ............ *G06F 16/487* (2019.01); *H04L 63/08* (2013.01); *H04L 63/105* (2013.01)

(58) Field of Classification Search
CPC ...... G06F 16/487; H04L 63/08; H04L 63/105
See application file for complete search history.

(56) References Cited

U.S. PATENT DOCUMENTS 7,315,243 B1 * 1/2008 Speakman ............ G08B 13/22
340/539.16
8,510,383 B2 8/2013 Hurley
(Continued)

FOREIGN PATENT DOCUMENTS

WO WO-2016073205 A1 * 5/2016
WO 2018201108 A1 11/2018
(Continued)

OTHER PUBLICATIONS

Brand Essence, "Global Virtual Events Market", Market Research Report, 2023-2029, 96 pgs., https://www.mynewsdesk.com/brandessence/pressreleases/virtual-events-market-in-depth-research-report-2021-3108067.
(Continued)

*Primary Examiner* — Aravind K Moorthy
(74) *Attorney, Agent, or Firm* — Lily Neff (57) ABSTRACT

A method, computer system, and a computer program product are provided for providing a multi-perspective multimedia output. In one embodiment, this comprises a first captured version of an event from a first capturing device and a second captured version of the event from a second capturing device. A geolocation polygon is then calculated based on a geolocation of the first capturing device used as a first point of reference, and a geolocation of the second capturing device used as a second point of reference. An ephemeral cloud is then established by determining any digital resources available within the geolocation polygon. The first and second captured versions are then processed by using the resources available within said ephemeral cloud. A single output is then generated using the processed first and second captured versions. The single output is a combination of the first and second captured versions.

20 Claims, 4 Drawing Sheets

(56) References Cited

U.S. PATENT DOCUMENTS

| | | | |
|---|---|---|---|
| 9,112,936 B1 | 8/2015 | Poletto | |
| 9,532,171 B2 | 12/2016 | Allen | |
| 9,553,838 B1* | 1/2017 | Panchenko | H04L 51/224 |
| 9,642,167 B1* | 5/2017 | Snyder | H04L 65/1094 |
| 9,774,696 B1* | 9/2017 | Calvert | H04L 67/52 |
| 9,836,466 B1* | 12/2017 | Brandwine | G06F 16/122 |
| 9,838,731 B1* | 12/2017 | Matias | G11B 27/10 |
| 10,135,899 B1* | 11/2018 | Nielsen | H04L 65/611 |
| 10,178,325 B2* | 1/2019 | Hyttinen | H04N 23/51 |
| 10,345,428 B1* | 7/2019 | Oden | G01S 5/0221 |
| 10,523,625 B1 | 12/2019 | Allen | |
| 11,010,207 B2* | 5/2021 | Carroll | G06F 9/5072 |
| 11,076,137 B1* | 7/2021 | Brazeau | H04N 9/3194 |
| 11,102,684 B1* | 8/2021 | Belser | H04W 36/0058 |
| 12,167,050 B2* | 12/2024 | Singh | H04L 65/61 |
| 2004/0085451 A1* | 5/2004 | Chang | G06T 15/10 348/159 |
| 2005/0138109 A1* | 6/2005 | Redlich | G06F 21/6272 709/201 |
| 2007/0139262 A1* | 6/2007 | Scherzinger | G01S 19/485 701/472 |
| 2008/0101277 A1* | 5/2008 | Taylor | G01S 5/0289 370/328 |
| 2008/0130597 A1* | 6/2008 | Kalhan | H04W 88/10 370/338 |
| 2008/0168135 A1* | 7/2008 | Redlich | G06F 16/282 709/204 |
| 2009/0178144 A1* | 7/2009 | Redlich | G06F 21/6209 726/27 |
| 2010/0153540 A1* | 6/2010 | Li | H04L 67/52 709/224 |
| 2010/0171763 A1* | 7/2010 | Bhatt | G06F 16/9537 715/764 |
| 2010/0293455 A1* | 11/2010 | Bloch | G11B 27/031 715/255 |
| 2012/0263439 A1 | 10/2012 | Lassman | |
| 2012/0324002 A1* | 12/2012 | Chen | G06F 16/51 709/204 |
| 2013/0058537 A1* | 3/2013 | Chertok | G06V 10/25 382/106 |
| 2014/0157113 A1* | 6/2014 | Krishna | G06F 40/58 715/249 |
| 2014/0258405 A1* | 9/2014 | Perkin | H04W 4/21 709/204 |
| 2014/0267229 A1* | 9/2014 | Ding | G06V 20/17 345/419 |
| 2015/0081207 A1* | 3/2015 | Briant | H04W 4/023 701/410 |
| 2015/0169142 A1 | 6/2015 | Longo | |
| 2015/0201030 A1 | 7/2015 | Longo | |
| 2016/0019465 A1* | 1/2016 | Milton | H04W 4/029 706/52 |
| 2016/0307047 A1* | 10/2016 | Krishnamoorthy | H04N 23/6811 |
| 2017/0150236 A1* | 5/2017 | Newman | H04N 5/77 |
| 2017/0195837 A1* | 7/2017 | Archer | H04W 4/023 |
| 2018/0026907 A1 | 1/2018 | Miller | |
| 2018/0070045 A1* | 3/2018 | Holmes | G11B 27/031 |
| 2018/0122141 A1* | 5/2018 | Campbell | H04N 21/21805 |
| 2018/0124191 A1* | 5/2018 | Nandi | G06F 16/9537 |
| 2018/0152836 A1* | 5/2018 | Milton | H04W 12/033 |
| 2018/0212975 A1* | 7/2018 | Bandi | H04L 63/0428 |
| 2018/0288461 A1* | 10/2018 | Funk | H04N 21/27 |
| 2018/0316901 A1* | 11/2018 | Carrier | G06V 10/95 |
| 2020/0077142 A1* | 3/2020 | Lavie | H04N 21/462 |
| 2020/0151962 A1* | 5/2020 | Holmes | G06F 3/04815 |
| 2020/0153623 A1* | 5/2020 | Asanghanwa | H04L 9/3213 |
| 2020/0267498 A1* | 8/2020 | Draper | H04W 4/029 |
| 2020/0292327 A1* | 9/2020 | Rabel | G06V 20/582 |
| 2020/0342129 A1* | 10/2020 | Chaiken | G06F 21/602 |
| 2020/0356900 A1* | 11/2020 | Briancon | G06N 20/20 |
| 2020/0364093 A1* | 11/2020 | Vasireddy | G06F 9/5061 |
| 2020/0366660 A1* | 11/2020 | Vasireddy | H04L 63/10 |
| 2021/0075761 A1* | 3/2021 | Li | H04L 61/103 |
| 2021/0131806 A1* | 5/2021 | Zaslavsky | H04L 63/0407 |
| 2021/0286840 A1 | 9/2021 | Amitay | |
| 2021/0319059 A1* | 10/2021 | Vianello | G06V 10/764 |
| 2021/0328855 A1 | 10/2021 | Trim | |
| 2022/0007082 A1* | 1/2022 | Okuda | G06T 13/20 |
| 2022/0076240 A1* | 3/2022 | Ghani | G06Q 20/4014 |
| 2022/0208230 A1* | 6/2022 | Spreitzer | G11B 27/034 |
| 2022/0349704 A1* | 11/2022 | Burke | G01S 5/0036 |
| 2022/0385575 A1* | 12/2022 | Langemak | H04L 45/38 |
| 2022/0398816 A1* | 12/2022 | Holmes | G06F 3/012 |
| 2022/0405663 A1* | 12/2022 | Kezunovic | G06Q 10/06311 |
| 2023/0052442 A1* | 2/2023 | Zass | G06V 20/41 |
| 2023/0116763 A1* | 4/2023 | Tarr | H04N 21/2743 386/241 |
| 2023/0164423 A1* | 5/2023 | Xu | H04N 23/611 348/222.1 |
| 2023/0376483 A1* | 11/2023 | Sharp | G06F 16/2457 |
| 2024/0007465 A1* | 1/2024 | Gupta | H04L 63/0807 |
| 2024/0037946 A1* | 2/2024 | Jain | G06V 20/44 |
| 2024/0045064 A1* | 2/2024 | Xu | G01S 17/89 |
| 2024/0071078 A1* | 2/2024 | Carder | G06T 7/70 |
| 2024/0091950 A1* | 3/2024 | Hong | G06T 7/50 |
| 2024/0098212 A1* | 3/2024 | Ooi | H04N 23/698 |
| 2024/0143409 A1* | 5/2024 | Bhardwaj | G06F 9/505 |
| 2024/0155549 A1* | 5/2024 | Qureshi | H04W 4/33 |
| 2024/0212118 A1* | 6/2024 | Liu | G06V 10/761 |
| 2024/0305999 A1* | 9/2024 | Kaushik | H04W 4/029 |
| 2024/0414265 A1* | 12/2024 | Mardakis | H04M 3/5116 |
| 2025/0004859 A1* | 1/2025 | Mouradian | G06F 9/5077 |
| 2025/0012577 A1* | 1/2025 | Pallemulle | G01C 21/3697 |

FOREIGN PATENT DOCUMENTS

| | | | | |
|---|---|---|---|---|
| WO | WO-2023212113 A1 | * | 11/2023 | |
| WO | WO-2024043994 A1 | * | 2/2024 | G06F 3/011 |

OTHER PUBLICATIONS

Elfeki, et al., "From Third Person to First Person: Dataset and Baselines for Synthesis and Retrieval", arXiv:1812.00104v1 [cs.CV], 10 pgs., Dec. 1, 2018.

IBM, "IBM Strategic Partnerships", IBM.com, [Accessed Jul. 24, 2023], 28 pgs., Retrieved from the Internet: <https://www.ibm.com/strategic-partnerships?lnk=fab>.

IBM, "IBM Video Streaming Support Center", IBM.com, [Accessed Jul. 24, 2023], 3 pgs., Retrieved from the Internet: <https://support.video.ibm.com/hc/es>.

IBM, "IBM Video Streaming", IBM.com, [Accessed Jul. 24, 2023], 7 pgs., Retrieved from the Internet: <https://www.ibm.com/products/video-streaming>.

Klimovic, et al., "Pocket: Elastic Ephemeral Storage for Serverless Analytics", ACM, OSDI '18: Proceedings of the 13th USENIX Conference on Operating Systems Design and Implementation, Oct. 8, 2018, pp. 427-444, https://dl.acm.org/doi/10.5555/3291168.3291200.

Lu, et al., "MediaQ: Mobile Multimedia Management System", ResearchGate, Conference Paper, MMSys '14, Mar. 19-21, 2014, ACM, 13 pgs., https://dl.acm.org/doi/abs/10.1145/2557642.2578223.

Nawrocki, "IBM Video Streaming 2023 Price Increases", IBM.com [Accessed Jul. 24, 2023], 23 pgs., Retrieved from the Internet: <https://blog.video.ibm.com/>.

Romo, "Guidance on the Collection of Polygon Location Data for Sustainability Systems", ISEAL Alliance, 2020, 49 pgs., https://www.isealalliance.org/sites/default/files/resource/2020-11/Guidance-on-the-collection-of-polygon-data_ISEAL-2020.pdf.

Silva, et al., "Ephemeral Data Storage for Networks of Hand-held Devices", ResearchGate, Conference Paper, Aug. 2016, 9 pgs., https://www.researchgate.net/publication/306379948_Ephemeral_Data_Storage_for_Networks_of_Hand-Held_Devices.

Teledyne Flir, "Intelligent Transportation Solutions Incident Detection", FLIR.com, [Accessed Jun. 28, 2023], 6 pgs., Retrieved from the Internet: <https://www.flir.com/traffic/incident-detection/>.

(56) References Cited

OTHER PUBLICATIONS

Yang, et al., "Pose Guided Human Video Generation", ECCV 2018 LNCS, SpringerLink, 16 pgs., https://openaccess.thecvf.com/content_ECCV_2018/papers/Ceyuan_Yang_Pose_Guided_Human_ECCV_2018_paper.pdf.

* cited by examiner

EPHEMERAL CLOUD FOR MULTI-PERSPECTIVE MULTIMEDIA GENERATION

BACKGROUND

The present invention relates generally to the field of digital multimedia generation and more particularly to techniques for generating cloud based multi-perspective multimedia.

Generation and broadcasting of multimedia events have always been very popular. Sports broadcasting events, weddings and graduations, reunions and performances have long been recorded for immediate or future consumption. The invention of digital photography and the availability of cameras on mobile devices have only added to the popularity of multimedia generation in recent years.

In the past, a professional photographer had to be hired for capturing and recording of most special events due to equipment requirements and costs. In recent years, the availability of equipment and lowered costs, have allowed videos/audio captures to be performed from multiple device and without the use of any professional persons. Besides personal event categories, such as weddings and graduations, there is less need for hiring professionals even for business and entertainment events such as conferences and concerts. This is because the participants and attendees can now generate videos and audio of the event on their own mobile devices. In some cases, the availability of cameras and recording equipment has allowed an opportunity to capture spontaneous news and other important moments. These may include "street events" such as accidents, social unrest, funny mishaps and the like. Whether planned or not-planned, all these events have certain characteristics in common. They all include generated audios/videos (egocentric and exocentric). In instances where multiple copies of each video may exist from different angles and perspectives, it would be desirous to have a single summarized video of such events that provides the event being captured from multiple angles.

SUMMARY

Embodiments of the present invention disclose a method, computer system, and a computer program product for a multi-perspective multimedia output. In one embodiment, a first captured version of an event from a first capturing device and a second captured version of the event from a second capturing device. A geolocation polygon is then calculated based on a geolocation of the first capturing device used as a first point of reference, and a geolocation of the second capturing device used as a second point of reference. An ephemeral cloud is then established by determining any digital resources available within the geolocation polygon. The first and second captured versions are then processed by using the resources available within said ephemeral cloud. A single output is then generated using the processed first and second captured versions. The single output is a combination of the first and second captured versions.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
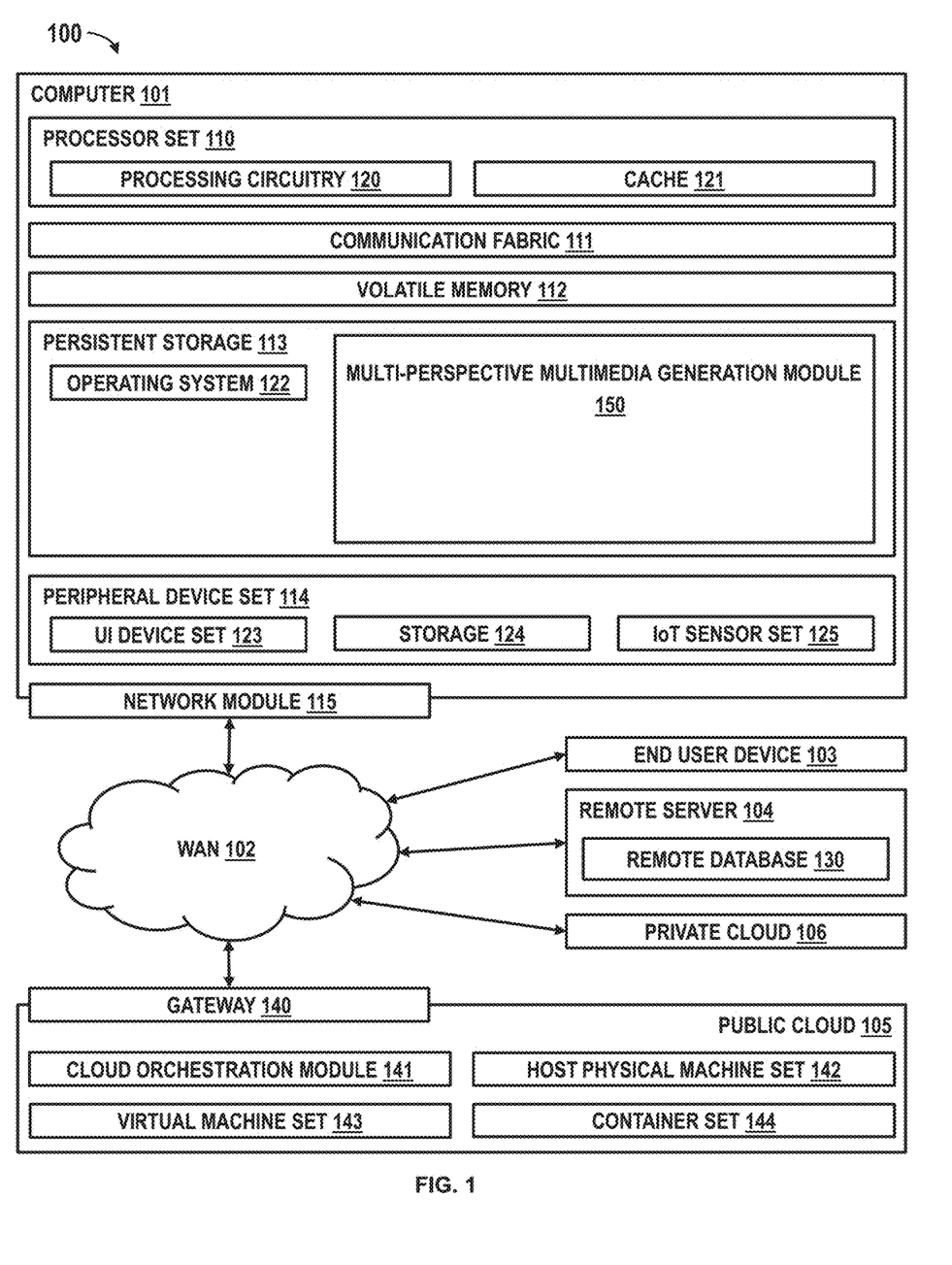
FIG. 1 illustrates a networked computer environment, according to at least one embodiment.

FIG. 1 provides a block diagram of a computing environment 100. The computing environment 100 contains an example of an environment for the execution of at least some of the computer code involved in performing the inventive methods, such as code change differentiator which is capable of providing a selective printing module (150). In addition to this block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
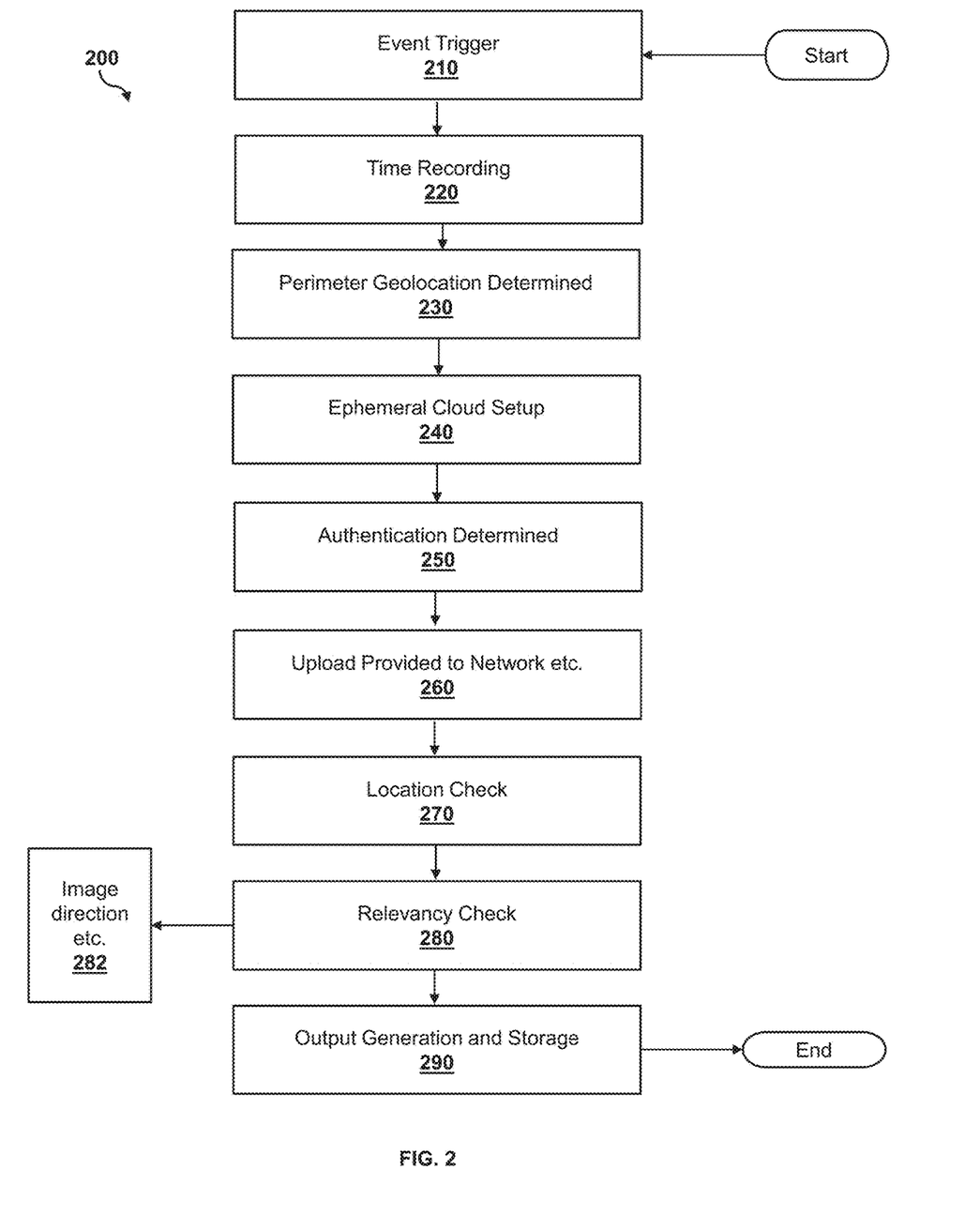
FIG. 2 provides an operational flowchart for generating a multi-perspective output, according to one embodiment.

FIG. 2 is a flowchart providing an illustration of an embodiment providing the generation of a multi-perspective multimedia. The process 200 shown in FIG. 2, in one embodiment as will be discussed through Steps 210-270, provides a single output. The output provides multi-perspective media and may be provided by a computer or eve an Artificial intelligence (AI) engine having one or more models including machine language models that can be trained. In one embodiment, the methodology commences with the triggering of an event (event trigger) that is currently happening or to be happening in the future as shown in Step 210.

In one embodiment, the event may be anticipated as to time and place and the capture may be prearranged such as by a user or users or by a machine such as an Artificial Intelligence (AI) engine. In another embodiment, the event capture is triggered dynamically by one or more or devices (automatic or user devices) capturing an event.

In one embodiment, the event to be captured is not an event that is being recorded spontaneously or that is being scheduled for capture. In one embodiment, the event has already been captured at least by two or more users. In one such scenario, one or more reporters of the events may upload the multimedia to a platform (social network, etc.) or use other means of sharing it with a digital network as known by those skilled in the art.

In Step 220, an event start time is denoted. When possible an end time should be indicated when the event is scheduled but can be provided later for spontaneously captured events. In one embodiment, when the capture is prearranged, the start time and end time is known and easy to ascertain. The same is true of the event has already been recorded and is being uploaded or provided to a network after the fact. However, when the event is being spontaneously recorded, such as during a live event, the end time cannot be ascertained until the end of the event and therefore the end time will be denoted by the process at a later time. The end, in one embodiment, may be denoted by no further captures being recorded to submitted.

In one embodiment, the process determines that an event may be occurring based on the multimedia metadata. For example, in one example this could be the start of the live recording or uploading of the event to a social network. The entity generating multimedia of the event can be a human or a smart device (like a traffic camera), and will be interchangeably referenced as "event reporters".

In Step 230, a geolocation perimeter will be created. In one embodiment, the geolocation perimeter may be considered as a polygon for ease of understanding, but geometric requirements are not necessary and the perimeter can be in any shape, geometric or irregular as can be appreciated by those skilled in the art.

The polygon or perimeter geolocation is determined and calculated, in one embodiment, with an initial point of reference defined during initialization. The geolocation polygon will be used to find the multimedia (and/or devices etc.) are associated with the event.

In one embodiment, the determination of the boundaries of the perimeter or polygon geolocation, can be prearranged beforehand. In other embodiments, where the capture is being performed spontaneously (or uploaded after the fact as multiple prerecorded events—where it is unknown that several users or user devices will be uploading them), the polygon will be determined dynamically, In one embodiment, as new devices add new captures from different perspectives, the boundaries of the perimeter/polygon may grow.

In Step 240, an ephemeral cloud will be provided (unleashed) for a variety of reasons. One reason is to determine what storage and services will be available to do the processing of the multimedia captures.

In Step 250, security levels for the ephemeral cloud may be determined and validated. This is because security levels on the ephemeral cloud may vary depending on the type of event. For example, for a wedding or a conference the users could be required to do specific verification checks to be approved before accessing the ephemeral cloud. However, if the event being captured is an emergency such as car crash, users could get automatic access to the ephemeral cloud by only providing a name.

In Step 260, the capture is uploaded to the network. If prearranged, the authorizations have been preapproved. Otherwise, if spontaneous or already recorded, once the users have accessed the ephemeral cloud, they can start uploading multimedia content which will be first validated, if multimedia passes the validation, then in can be used. The first validation will be the geolocation information, if the multimedia is within the location polygon it will be used, if it is not, it will be discarded (i.e., not stored in the ephemeral cloud). Other validations can be implemented depending on the type of event.

It should be noted that in one embodiment, different event reporters could unleash an ephemeral cloud creation once they meet the following conditions:
1) event ignition occurs in a certain place; and
2) if another event occurs in the same location, a threshold is generated;
   a. once evaluated, the media is similar, it sums as same event.
   b. the threshold provides the minimum event reporters to unleash an ephemeral cloud for a certain location.
3) if number of event reporters overcome the threshold, then an ephemeral cloud is asked to be created in that location to get more multimedia.

In one embodiment, the ephemeral cloud/clouds may be implemented as client-subscription schemas where different perspectives can be accessed based on the business case, i.e., not all cloud information could be available for the consumers in case there's a subscription constraint or be free. Same case for the event reporters (who upload to multimedia network).

Devices within the ephemeral cloud can request at any time to view a video of the multimedia uploaded for the event. For each request, the video processing will generate requested multimedia with all the multimedia available in the ephemeral cloud storage at the edge. The user can request to generate the video in chronological order, in which case the images will appear in the video sorted by the multimedia date-time creation attribute. If chronological order is not requested, the video will show the multimedia in the order that they were uploaded to the ephemeral cloud.

In Step 270, a multimedia location check is conducted. In short, if the multimedia metadata has a location attribute, the location is checked within the geolocation polygon. If the location is within the geolocation polygon, then the process will allow a file to remain in the ephemeral cloud. If the location does not fall within the geolocation polygon, then the file is deleted or not associated with the multimedia from the ephemeral cloud. Therefore, in one embodiment, the multimedia location check comprises providing a metadata location attribute of a captured event, and verifying that the captured event(s) originated from users and/or user devices located within the geolocation polygon.

In Step 280, a multimedia relevancy check is conducted. In one embodiment, this step comprises determining the using of an image recognition and even tools like gyroscopes that may be readily available such as on a mobile device. This information may be relevant in flagging whether the content is important to the cloud ephemeral or is not of sufficient relevancy. In one embodiment, where an image recognition is used (such as to determine if the images are from the same event), the recognition can be performed using available services or even an AI based service. For example, a first image when uploaded will set a baseline for reference and comparison for the next visual content that will be uploaded. In one embodiment, regardless of which service is used, the returning values will be segregated to fit into the following categories: same, similar, not-similar.

In one example, when information such as those obtained by a gyroscope is available, this type of information such as from the metadata of the multimedia may be used to determine if the images are pointing to the same spot and that information correlates. This can be performed in a image analysis complementary step as shown at Step 282.

In Step 290 a multi-perspective multimedia output is generated that is relevant to the particular event initiated. In one embodiment, the output is a single but multi-perspective presentation. The presentation can be for example a file containing images and video or live stream content. In one embodiment, this generated output is provided dynamically to one or more user/user devices. Alternatively, the output is stored for later retrieval and consumption by one or more user/user devices or for AI training.

As discussed in Step 250, access to the network may be dependent on the security or authentication level. This may persist for the ultimate viewing of the final output or may vary or be altered over time. For example, an authorization code or a list of those that have security clearance may only be able to view the output. This can include a variety of different individuals based on the reason for the output generation. Some examples can include police or security forces, accident investigators or even viewers of a particular client subscriptions. The output can also be edited to provide particular views that are more important or relevant based on the purpose. For example, for the client-subscription schemas, different perspectives can be accessed and presented based on the business case (i.e., not all cloud information could be available for the consumers in case there's a subscription constraint or be free. Same case can be provided and assessed based on the event reporters (who uploads multimedia).

In one embodiment, the access/permission may also depend on proximity. For example, devices within the ephemeral cloud may be able to request, at any time, to view a video of the multimedia uploaded for the event. For each request, the multimedia processing will generate requested multimedia with all the multimedia available in the ephemeral cloud storage at the edge. The user can request to generate the video in chronological order, in which case the images will appear in the video sorted by the multimedia date-time creation attribute. If chronological order is not requested, the multimedia will present the output (or output components captured and later generated as a single multimedia) in the order that they were uploaded to the ephemeral cloud.

In short, the process 200 can dynamically create an ephemeral multimedia cloud using events and their locations. A trigger point for the event is generated that would be different for different multimedia's being generated in a specific location (such as through different event igniters.) A geolocation perimeter or polygon is generated to dynamically ingest information based on multimedia's metadata as associated with the type of triggering event and its location. This will lead to the creation of an ephemeral multimedia cloud to ultimately provide a final output encompassing different user's perspectives into a single production multimedia presentation.

Figure 3A:
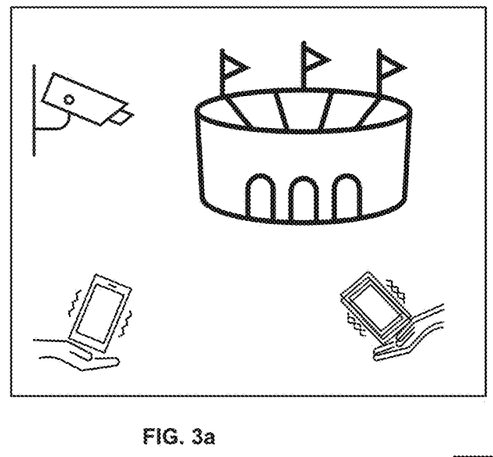
FIGS. 3a and 3b provides a block diagram of two different events being captured by devices.
Figure 3B:
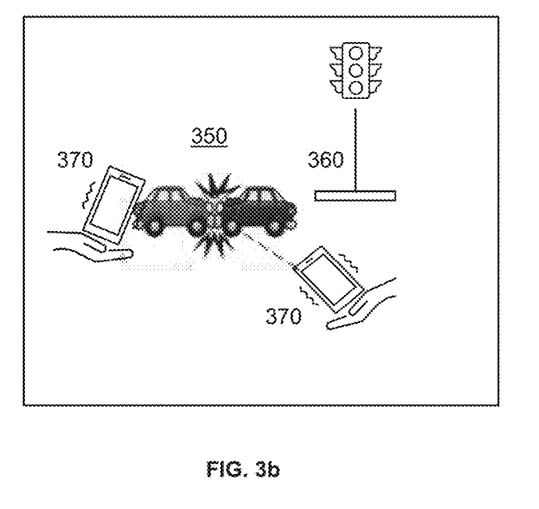

FIGS. 3*a* and 3*b* provide block diagrams of two different examples of events being recorded. In FIG. 3*a*, a concert being performed on a stage or arena denoted by 310 is being performed and a variety of event reporters denoted as 320 are recording the concert. In FIG. 3*a*, multiple users and or even automatic devices have become event reporters.

In FIG. 3*b*, a smart traffic light 360 identifies that a crash 350 occurred. In addition, as different individuals pass near the crash and they capture the event on their phones 370 and upload multimedia of the event (also increasing the geolocation polygon as different users upload new images). In this particular situation, by default, the start date and event name will be set as follow:

Start date-time=current date time

Event name=current date time+starting geolocation point

The end time will be left empty. All these parameters can be modified after ignition.

Figure 4:
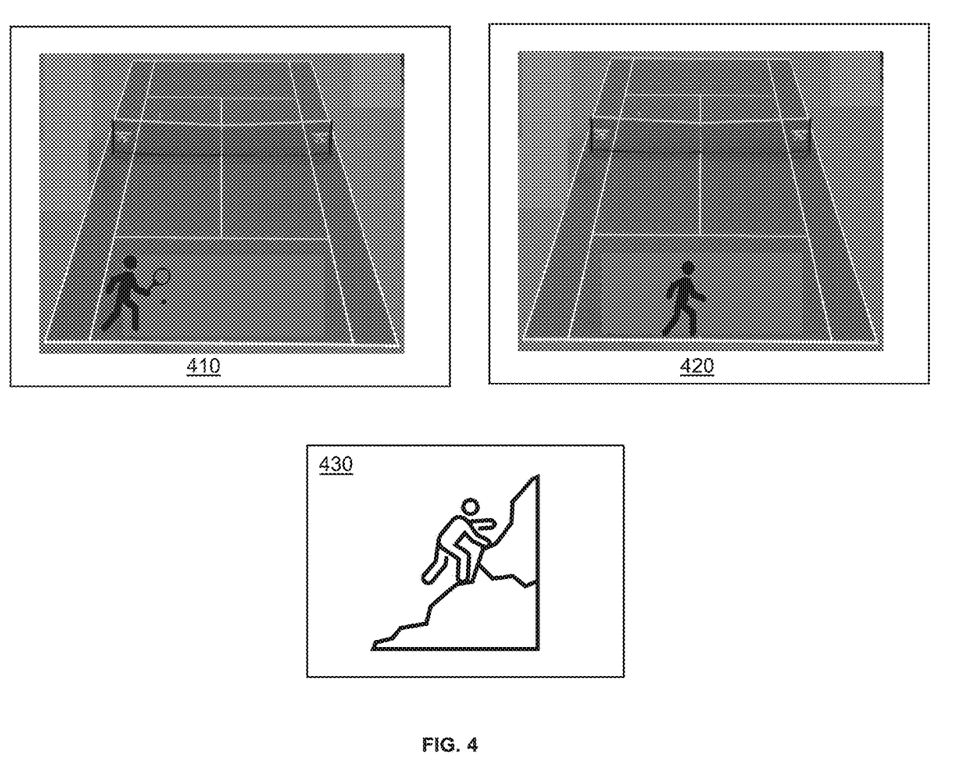
FIG. 4 provides a block diagram of different samples being evaluated to ensure they belong to the same event.

FIG. 4, provides a series of block diagrams providing an example of a multimedia capture during a tennis match. The box denoted by 410 is an image capture that will be used as a baseline for later image comparisons. This box shows a side view of a tennis player with a racket and a ball at the bottom left portion of the tennis court. The next uploaded image is shown at 420. The image 420 will be compared to the baseline image 410 and if it is determined and evaluated that the two images are the "same" then it will be added to a sequence catalogue but not used necessarily in output generation a second time. However, if the image is evaluated as "similar" but not the same, the metadata (in on embodiment this can be the location plus the gyroscope data for instance) of the currently uploaded image will be compared with the baseline to decide if the image should be used. In such a case, when the multimedia is evaluated as 'similar', the date-time and geolocation (taken from the metadata of the currently uploaded multimedia) will be compared with the baseline. If the date-time and the geolocation of the currently uploaded multimedia are within a pre-defined range in relationship with the baseline image (e.g. date-time is +−5 hours, date-time is +−30 minutes, geolocation is within geolocation polygon), the multimedia will get added to the sequence catalog. If the date-time and the geolocation are out of range, the multimedia will be discarded.

In one embodiment, the when the images are evaluated as being "the same" or "very similar", but the date-time and geolocation information will not correspond to one another, then they will be deemed as two separate images in a sequence, even though they may be the same or very similar.

In one embodiment, if the image is evaluated to be dissimilar (or not similar or other such labels), the image will be discarded from the ephemeral cloud. This is shown at 430.

To help further understanding, some examples now can be used. These examples are only provided for understanding and a variety of scenarios can be provided using same or alternate embodiments. In a first example, a family J is invited to a wedding. Hundred other guests are also attending the wedding and many of the guests to this event have one or more mobile devices such as mobile phones that they will be using during the event. Most of the phones have a camera and capability to capture good quality photos or videos.

Many of the guests will take pictures or record videos of this unique event. There will also be some professional photographers hired to cover this event. Using the process 200 discussed, all the captured media can be collected as generated from the other attendees. Based on the geolocation of the devices available by the users or user devices (that the guests or other people bring to the event) a polygon encompassing the area where the wedding is happening will be generated dynamically in real time.

Once this polygon is defined, all the media generated within the polygon will be processed, sorting it chronologically and uploading it to an ephemeral cloud. In other words, a polygon comprising the area of the wedding will be defined and all the media generated will be chronologically sorted and uploaded to an ephemeral cloud created also, previously for the event. Once the media is sorted and uploaded to the ephemeral cloud, the process 200 will create a single output (here video) from all the saved media, containing all the points of view from all of the guests. This unique output (video) will be available for the bride and groom for a predefined period of time and will complement the work from the professional services they hired to cover their event.

In another example, recordings are made during an emergency scenario. In this example, an explosion occurs in a warehouse near a tourist landmark. At the location arrives the emergency services as well many reporters from news channels, also tourists who were already nearby are approaching the incident site. All of the actors, in this scenario, will start generating media in the form of pictures or video. By using our method all media sources will provide a geolocation point to generate a polygon that comprises the area of the incident, then all the generated content within the polygon will be uploaded to the ephemeral cloud and sorted chronologically.

Once the media is organized, a single video will be created and will be available during a predefined period of time and could be used for example; for the news channels to present from different angles of the incident, authorities to investigate the causes of the accident or even to locate potential victims that otherwise might be overlooked. In one embodiment, eventually the content and the ephemeral cloud will be deleted and the used space released on the storage.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of providing a multi-perspective multimedia output, comprising:
    receiving a first captured version of an event from a first capturing device and a second captured version of said event from a second capturing device;
    calculating a geolocation polygon based on a geolocation of said first capturing device used as a first point of reference, and a geolocation of said second capturing device used as a second point of reference;
    establishing an ephemeral cloud by determining any digital resources available within said geolocation polygon;
    processing said first captured version and said second captured version by using said resources available within said ephemeral cloud; and
    generating a single output using said processed first captured version and said processed second captured version of said event, wherein said single output is a combination of said first captured version and said second captured version.

2. The method of claim 1, wherein there are at least three capturing devices and each of said at least three capturing devices provides an associated captured versions of said event.

3. The method of claim 2, wherein said single output is generated by combining at least three associated captured versions.

4. The method of claim 3, wherein each of said at least three associated captured versions provides said event from different perspectives according to a location of capture.

5. The method of claim 2, wherein said polygon is established after receiving two of said at least three associated captured versions.

6. The method of claim 5, further comprising:
    receiving a new captured version; and
    verifying that that said new captured version relates to said event.

7. The method of claim 6, further comprising:
    expanding said geolocation polygon when said new captured version is verified to relate to said event.

8. The method of claim 1, wherein said single output is stored for later viewing.

9. The method of claim 8, further comprising:
    providing access to said single output to a user after an authentication process has been completed.

10. The method of claim 9, wherein said authentication process includes verifying a user identification and security access level authorization as provided by a user access list.

11. A computer system for providing a multi-perspective media output, comprising:
    one or more processors, one or more computer-readable memories and one or more computer-readable storage media;
    program instructions, stored on at least one of the one or more storage media for execution by at least one of the one or more processors via at least one of the one or more memories, to receive a first captured version of an event from a first capturing device and a second captured version of said event from a second capturing device;
    program instructions, stored on at least one of the one or more storage media for execution by at least one of the one or more processors via at least one of the one or more memories, to calculate a geolocation polygon based on a geolocation of said first capturing device used as a first point of reference, and a geolocation of said second capturing device used as a second point of reference;
    program instructions, stored on at least one of the one or more storage media for execution by at least one of the one or more processors via at least one of the one or more memories, to establish an ephemeral cloud by determining any digital resources available within said geolocation polygon;
    program instructions, stored on at least one of the one or more storage media for execution by at least one of the one or more processors via at least one of the one or more memories, to process said first captured version and said second captured version by using said resources available within said ephemeral cloud; and program instructions, stored on at least one of the one or more storage media for execution by at least one of the one or more processors via at least one of the one or more memories, to generate a single output using said processed first captured version and said processed second captured version of said event, wherein said single output is a combination of said first captured version and said second captured version.

12. The computer system of claim 11, wherein there are at least three capturing devices and each of said at least three capturing devices provides an associated captured version of said event.

13. The computer system of claim 12, wherein said single output is generated by combining at least three associated captured versions.

14. The computer system of claim 13, wherein each of said at least three associated captured versions provide said event from different perspectives according to a location of capture.

15. The computer system of claim 12, wherein said polygon is established after receiving two of said at least three associated captured versions.

16. The computer system of claim 11, wherein said single output is stored for later viewing.

17. A computer program product for providing multi-perspective media output, the computer program product comprising:

one or more computer readable storage media;

program instructions, stored on at least one of the one or more storage media for execution by at least one of the one or more processors via at least one of the one or more memories, to receive a first captured version of an event from a first capturing device and a second captured version of said event from a second capturing device;

program instructions, stored on at least one of the one or more storage media for execution by at least one of the one or more processors via at least one of the one or more memories, to calculate a geolocation polygon based on a geolocation of said first capturing device used as a first point of reference, and a geolocation of said second capturing device used as a second point of reference;

program instructions, stored on at least one of the one or more storage media for execution by at least one of the one or more processors via at least one of the one or more memories, to establish an ephemeral cloud by determining any digital resources available within said geolocation polygon;

program instructions, stored on at least one of the one or more storage media for execution by at least one of the one or more processors via at least one of the one or more memories, to process said first captured version and said second captured version by using said resources available within said ephemeral cloud; and program instructions, stored on at least one of the one or more storage media for execution by at least one of the one or more processors via at least one of the one or more memories, to generate a single output using said processed first captured version and said processed second captured version of said event, wherein said single output is a combination of said first captured version and said second captured version.

18. The computer program product of claim 17, wherein there are at least three capturing devices and each of said at least three capturing devices provides an associated captured version of said event.

19. The computer program product of claim 18, wherein said single output is generated by combining at least three associated captured versions.

20. The computer program product of claim 17, wherein said single output is stored for later viewing.

* * * * *